Figure 1:
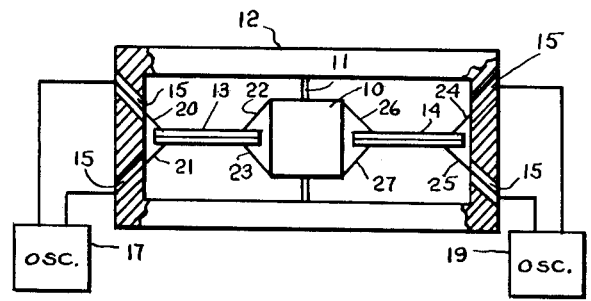

May 16, 1961  J. KRITZ  2,984,111
ACCELEROMETER
Filed June 19, 1959

INVENTOR.
JACK KRITZ
BY
ATTORNEY.

United States Patent Office 2,984,111
Patented May 16, 1961

2,984,111
ACCELEROMETER
Jack Kritz, Westbury, N.Y., assignor to American Bosch Arma Corporation, a corporation of New York
Filed June 19, 1959, Ser. No. 821,570
10 Claims. (Cl. 73—517)

The present invention relates to accelerometers and has particular reference to accelerometers utilizing vibrating members as part of the sensing means.

Vibrating string or tape accelerometers have been constructed in the past utilizing the principle that the natural frequency of vibration of a stretched string is a function of the tension applied. In the practical application thereof, the strings have been of metallic nature to allow good conductivity to an electric current so that the exciting force may be electromagnetically derived. A basic limitation of all accelerometers is their inherent stability under zero acceleration. A figure of merit can therefore be assigned which describes this stability of oscillating frequency, independent of the accelerating forces to be measured. As in all vibrating systems, this inherent stability is a critical function of the extraneous energy losses in the system. The ratio of stored energy per cycle to dissipated energy per cycle is commonly referred to as "Q." For improved frequency stability, the Q of an oscillating system is to be maximized.

One basic limitation in the use of metallic tapes or strings is that complete freedom in the choice of a material having low internal friction and high stability of physical constants is lacking. In particular, the use of an insulating material, such as crystalline quartz is impossible. This application describes an oscillating system utilizing quartz in a vibrating tape accelerometer. The advantages obtained are as follows: (a) Improvement in Q of orders from 10 to 100; (b) Miniaturization; (c) Simplicity and stability; (d) Linearity, and (e) Ease of assembly.

The principle involved utilizes the piezoelectric effect of crystalline quartz to maintain a tape in oscillation, allowing the tape frequency to be a function of the tension. The quartz tapes are fashioned as flexure mode crystals, the technique of which is old in the art.

Flexure mode crystals can be constructed of two bonded tapes of the proper polarity or a single piezoelectric bar with properly designed electrode plating. In either case, the application of a potential between electrodes causes the tape to flex or bend and vice versa, hence the name flexure mode crystal.

In embodying the flexure mode crystal tapes in an accelerometer, the tension in the tapes is adapted to be varied according to the acceleration in a manner similar to the earlier vibrating string accelerometers using metallic tapes. A pair of tapes are stretched between a frame and a proof mass, and the tapes are kept in vibration by connection of the tapes into the circuit of electronic oscillators. Upon acceleration of the frame, the force on the proof mass increases the tension in one tape and decreases the tension in the other tape. The natural frequency of the tapes thus corresponds to the acceleration and can be used to measure acceleration. The difference frequency provides a linear function of acceleration either directly or by compensation, as dictated by the choice of the various parameters in the particular construction used and the accuracy desired.

Figure 2:
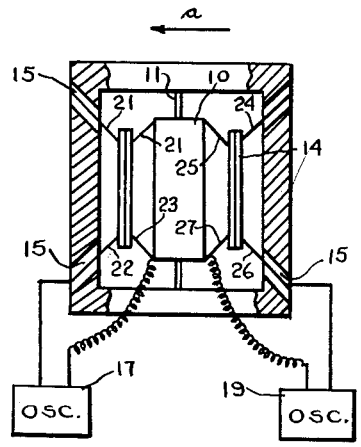
Figure 5:
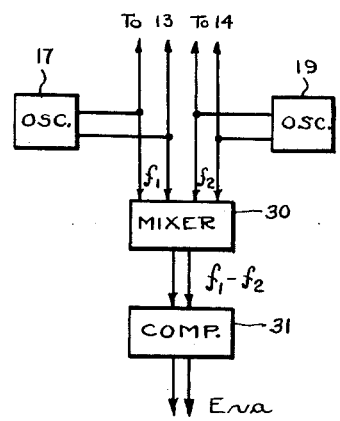
Figure 3:
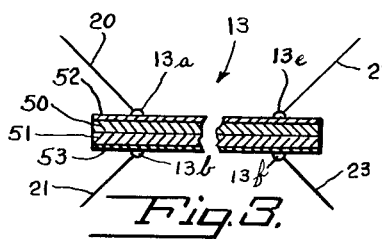
Figure 4:
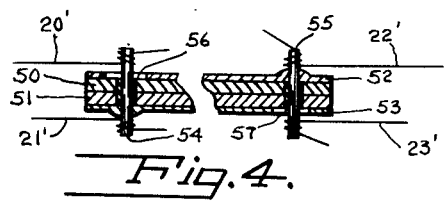

For a more complete understanding of this invention, reference may be had to the accompanying diagrams, in which Fig. 1 is a schematic representation of the basic configuration of this invention;
Fig. 2 is a modification of Fig. 1;
Fig. 3 is a cross section of a tape showing attachment of wires thereto;
Fig. 4 is a modification of Fig. 3; and
Fig. 5 illustrates auxiliary electrical circuitry for Figs. 1 and 2.

With reference now to Fig. 1 of the drawings, a schematic view of the basic accelerometer according to the present invention is shown. A weight 10 is supported by wires, tapes or a diaphragm 11 in the frame 12 in a manner to permit motion of the weight 10 only to the right and left in Fig. 1. Between the mass 10 and the left end of frame 12 is a flexure mode piezoelectric crystal bar 13 and aligned therewith on the opposite side of weight 10 and between the weight 10 and the right end of frame 12 is a similar flexure mode piezoelectric crystal bar 14.

The piezoelectric bars 13 and 14 are adapted for flexure mode vibration, and are preferably J-element benders or Curie strips made in the familiar form where a pair of X-cut quartz crystals 50, 51 of Fig. 3 are cemented together with like faces in contact and in which the Y axis is longitudinal of the crystals 50, 51 and the Z axis is perpendicular to the plane of the paper. Metallic plating 52, such as silver, on the outer surfaces of the crystals 50, 51 distribute the electrical charges over the surface of the tape and permit easy mechanical attachment of electrical leads such as 20, 21 to the crystals 50, 51 by means of soldering, for example. The invention, however, is not to be limited by this choice and other types of flexure mode crystals may be used, if desired.

For example, H-element benders which are X-cut bars with selected plating pattern or Y-cut benders which employ shear stress with special plating for producing flexure may be used.

The bar 13 is suspended in the frame 12 by attaching wires 20, 21 to the frame 12 and wires 22, 23 to the mass 10. The points of attachment 13a, b, e, f of wires 20, 21, 22, 23 to the crystal bar 13 are located at substantially the nodal points of the bar when it vibrates at its natural frequency. Similarly, the bar 14 is supported in the frame 12 by wires 24, 25, 26, 27 where wires 24, 25 extend between a nodal point on bar 14 and the frame 12 and the wires 26, 27 extend between the other nodal point on bar 14 and the weight 10. Each of the wires 20 through 27 makes an angle of forty-five degrees with the longitudinal axis of the crystal bars 13, 14.

The bars 13, 14 are kept in vibration at their natural frequency by the oscillators 17 and 19 respectively, as is well known in the art by including the piezoelectric tapes in the oscillator circuits, by connecting the bar 13 to oscillator 17 through the wires 20, 21 and the bar 14 to oscillator 19 through the wires 24, 25. For this reason, the wires 20, 21, 24 and 25 are insulated from the frame 12 by the electrical insulating material 15.

As will be shown, the change in natural frequency of the bars 13, 14 which results from the acceleration force on weight 10 can be used to indicate the acceleration. Briefly, the indication is accomplished by determining the difference frequency in the outputs of the oscillators 17 and 19, and by proper choice of parameters or compensation circuits or both, the difference frequency is made substantially linearly proportional to the acceleration.

The natural resonant frequency of a piezoelectric tape is given by an expression of the following form:

$$f_1 = R_1 \sqrt{\frac{E}{\rho} \frac{h}{L^2}} \sqrt{1 + \frac{R_2}{E} \frac{L^2}{bh^3} T} \qquad (1)$$

where:

$h$ is the tape thickness
$b$ is the tape width
$L$ is the tape length
$T$ is the tension applied along the length
$E$ = Young's modulus
$\rho$ = density $R_1$, $R_2$ are constants which depend on the system of measurements used and the end conditions of the tape. For simplicity, Equation 1 may be written as:

$$f = K(1+CT)^{1/2} \quad (2)$$

It will be seen that for realizable values of $T$ which do not exceed the strength capabilities of the tape the dimensions of $b$, $h$ and $L$ may be chosen so as to make the $CT$ term large or small with respect to unity.

If $b$ and $h$ are small, $CT$ is much greater than unity and Equation 2 becomes:

$$f = K\sqrt{CT} \quad (3)$$

while, if $b$ and $h$ are large enough to make $CT$ much smaller than unity, Equation 2 can be expressed as the series:

$$f = K\left(1+\frac{1}{2}CT-\frac{1}{8}(CT)^2+\frac{1}{16}(CT)^3 \ldots\right) \quad (4)$$

The condition of Equation 3 is obtained in the tension controlled systems typified by vibrating mechanical strings or wires and it will be seen that the frequency of vibration is proportional to the square root of the tension.

In the present invention, however, in distinction to prior devices, the thickness width and length of the tapes are chosen so that the vibrating member in reality becomes a bar which vibrates at a frequency primarily determined by its dimensional and physical constants and the conditions of Equation 4 apply. Since $CT$ is much smaller than unity it will be seen that Equation 4 is a substantially linear function in $T$.

Since $CT$ is much smaller than unity, it would appear that the sensitivity of the device is small since the tension change has a small effect on the resonant frequency. However, the sensitivity of any system is dependent upon the stability of the system, so that a device which is relatively insensitive to tension changes can become ultra-sensitive if the frequency stability in the absence of tension changes is extremely good. A very small percentage change of a high but stable frequency leads to significant output that can be extremely sensitive to accelerations when used in an accelerometer. The use of piezoquartz as the vibrating bar makes this possible, while the use of conducting metals as the vibrating member precludes the attainment of the requisite stability for this system.

The tension $T$ is composed of two components, a steady initial tension $T_o$ and a change $\Delta T$ due to the acceleration force, $Ma$, of the weight 10. Thus, for acceleration to the left in the figures, the tension in tape 13 may be expressed as $T = T_o + \Delta T$ and the tension in tape 14 may be expressed as $T = T_o - \Delta T$. Accordingly, the frequency $f_1$ of the signal from oscillator 17 is:

$$f_1 = K\left(1+\frac{1}{2}C(T_o+\Delta T)\right.$$
$$\left. -\frac{1}{8}C^2(T_o+\Delta T)^2+\frac{1}{16}C^3(T_o+\Delta T)^3 \ldots\right) \quad (5)$$

and the frequency $f_2$ of the output of oscillator 19 is:

$$f_2 = K\left(1+\frac{1}{2}C(T_o-\Delta T)\right.$$
$$\left. -\frac{1}{8}C^2(T_o-\Delta T)^2+\frac{1}{16}C^3(T_o-\Delta T)^3 \ldots\right) \quad (6)$$

The difference frequency then becomes:

$$f_1-f_2 = f = K\left(\frac{1}{2}C[(T+\Delta T)-(T-\Delta T)]\right.$$
$$-\frac{1}{8}C^2[(T+\Delta T)^2+(T-\Delta T)^2]$$
$$\left.+\frac{1}{16}C^3[(T+\Delta T)^3-(T-\Delta T)^3] \ldots\right)$$

which can be reduced to $$f = KC\Delta T\left[1-\frac{CT_o}{2}+\frac{3}{8}CT_o^2+\frac{1}{8}(C\Delta T)^2 \ldots\right] \quad (7)$$

In Equation 7 the term $KC\Delta T$ represents the basic acceleration which is to be measured, while the remaining terms represent the errors. Higher order terms are neglected since they become small compared to the others. As an example of the stability obtainable by this means, assume that the factor $CT_o$ is about 1/500. The first error term is $$\frac{CT}{2} \text{ or about } 1/1000$$

Thus, for a calibration error of one part in a million a variation of one part per thousand in $T_o$ can be tolerated. In a tension controlled system this same variation in $T_o$ would result in an error of one part in 2000. The second term can be neglected in comparison to the first term.

The last term of the series expresses the non-linearity of the accelerometer. The limit of acceleration change $\Delta T$ cannot be greater than $T$, whence under the assumed value of $$CT = \frac{1}{500}$$

the non-linear term is not more than $$\frac{1}{8}\left(\frac{1}{500}\right)^2$$

or one part in two million.

Thus, it will be seen that a substantially linear output is obtained and a low initial tension can be used to advantage. In fact, it the mechanical structure is designed so as to permit compressive forces to be applied to the bar, the initial tension could be eliminated altogether.

The use of piezoquartz has other advantages as well. The driving mechanism does not require magnets and magnet structures, resulting in a smaller and lighter device. With the use of the rigid bar, the point of application of force is moved to the nodal points of flexural motion, thereby reducing the vibratory energy coupled with the supporting structure and consequently increasing Q while decreasing coupling between the sensitive bars.

Fig. 5 shows schematically the basic instrumentation of the Equation 7. The $f_1$ and $f_2$ outputs of oscillator 17 and 19 are applied to a mixer 30 which produces a signal having a frequency equal to the difference frequency $f_1-f_2$. The difference frequency is applied to a computer 31 which determines $\Delta T$ from Equation 7 and determines the acceleration, $a$, from $\Delta T$, which is proportional to the product of mass of weight 10 and the acceleration. The computer 31 may transform the frequency difference into a proportional voltage. The components of the auxiliary apparatus, such as oscillators 17, 19, mixer 30 and computer 31, are standard in the art, and should not require further description here for an understanding of the invention. In fact, the circuitry of Fig. 5 may be found in many embodiments and elaboration of the preferred circuitry may lead to undesirable limitations.

The "in-line" arrangement of bars 13, 14 as shown in Fig. 1 can be modified into a more compact unit as shown in Fig. 2.

In this apparatus, the mass 10 is again supported in the frame 12 by the cross support 11, and is free to respond to acceleration to the right and left in Fig. 2. The piezoelectric bars 13, 14 are positioned so that their plane surfaces are perpendicular to the direction of acceleration, *a*, and suspension wires 20—27 extended from the nodal points 13*a*, *b* and 14*a*, *b* to the frame 12 and mass 10 at 45° angles to the surface of the bars 13, 14. Acceleration in the direction of the arrow tends to tighten the suspension wires 20—23 on the left and a component of the tension in the wires 20—23 acts longitudinally of the bar 13 to vary the tension in the bar 13 accordingly. Simultaneously, the suspension wires on the right are slackened to cause a reduction of the tension in the bar 14. All suspension wires 20—27 are again insulated electrically from the frame 12 and mass 10 and the wires 22, 23 and 26, 27 may be utilized to connect the opposite surfaces of each bar 13, 14 to the respective oscillators 17, 19 as shown.

The forms of Figs. 1 and 2 have been adopted because the present method of attaching the wires 20—23 to the bar 13 does not permit the wires 20—23 to extend parallel to the plane of the tape without interference. In these forms, however, only a fraction of the total force acting on the mass 10 is used to vary the tension of the tapes. To take advantage of the full force available, an improved means of attaching the wires to the nodal points is desired.

Fig. 4 shows a special tape of advanced design in which the piezoelectric crystals 50, 51 are cemented together. Holes are drilled in the tapes at the nodal points and electrically conducting pins 54, 55 are inserted therein. Insulating bushings 56, 57 may be interposed between the pins and the piezoelectric body. The silver plating 52 covers top of the upper crystal 50 and is in intimate contact with pin 55 but is separated from pin 54. The silver plating 53 covers the bottom of the lower crystal 52 and is in intimate contact with pin 54, but is separated from pin 55. Wires 20', 21' are secured to the pin 54 and extend parallel to the plane of the tape 13 to the support 12 while the wires 22', 23' are secured to the pin 55 and extended parallel to the plane of the tape 13 to the mass 10 as suggested by Fig. 1, but not illustrated elsewhere. One side of electronic oscillator 17 is connected to the pin 56 through the wire 20' or 21' while the other side of oscillator 17 is connected to the pin 57 through the wire 22' or 23'.

I claim:

1. In an accelerometer for sensing acceleration along an axis, a frame, a mass suspended in said frame for freedom of motion along said axis, a flexure mode piezoelectric bar, means for suspending said bar for free end vibration between said mass and said frame symmetrically with respect to said axis, said means including tension members attached to said bar at substantially the nodal loci and extendng between said bar and said frame and between said bar and said mass and adapted to vary the longitudinal tension of said bar in accordance with the change in tension in said tension members.

2. In an accelerometer for sensing acceleration along an axis, a frame, a mass suspended in said frame for freedom of motion along said axis, a flexure mode piezoelectric bar, means for suspending said bar for free end vibration between said mass and said frame symmetrically with respect to said axis, said means including a plurality of tension members attached at one end to said bar at substantially the nodal loci, one half of said tension members being attached at the other ends to said mass and the other half of said tension members being attached at the other ends to said frame at locations displaced longitudinally of said bar from said nodal loci away from the center of said bar whereby the tension in said bar is varied in accordance with the change in tension in said tension members.

3. In an accelerometer for sensing acceleration along an axis, a frame, a mass suspended in said frame for freedom of motion along said axis, a pair of flexure mode piezoelectric bars, means for suspending each of said bars for free end vibration between said mass and said frame symmetrically with respect to said axis, said means including tension members attached to each of said bars at substantially the nodal loci and extending between each of said bars and said frame and between each of said bars and said mass and adapted to vary the longitudinal tension of each of said bars in accordance with the change in tension in said tension members.

4. In an accelerometer for sensing acceleration along an axis, a frame, a mass suspended in said frame for freedom of motion along said axis, a pair of flexure mode piezoelectric bars, means for suspending each of said bars for free end vibration between said mass and said frame symmetrically with respect to said axis, said means including a plurality of tension members attached at one end to each of said bars at substantially the nodal loci, one half of said tension members being attached at the other ends to said mass and the other half of said tension members being attached at the other ends to said frame at locations displaced longitudinally of each of said bars from said nodal loci away from the center of each of said bars whereby the tension in each of said bars is varied in accordance with the change in tension in said tension members.

5. In an accelerometer for sensing acceleration along an axis, a frame, a mass suspended in said frame for freedom of motion along said axis, a flexure mode piezoelectric bar, means for suspending said bar for free end vibration between said mass and said frame symmetrically with respect to said axis, said means including tension members attached to said bar at substantially the nodal loci and extending between said bar and said frame and between said bar and said mass and adapted to vary the longitudinal tension of said bar in accordance with the change in tension in said tension members, oscillator means for keeping said bar vibrating at its natural frequency.

6. In an accelerometer for sensing acceleration along an axis, a frame, a mass suspended in said frame for freedom of motion along said axis, a flexure mode piezoelectric bar, means for suspending said bar for free end vibration between said mass and said frame symmetrically with respect to said axis, said means including a plurality of tension members attached at one end to said bar at substantially the nodal loci, one half of said tension members being attached at the other ends to said mass and the other half of said tension members being attached at the other ends to said frame at locations displaced longitudinally of said bar from said nodal loci away from the center of said bar whereby the tension in said bar is varied in accordance with the change in tension in said tension members, oscillator means for keeping said bar vibrating at its natural frequency.

7. In an accelerometer for sensing acceleration along an axis, a frame, a mass suspended in said frame for freedom of motion along said axis, a pair of flexure mode piezoelectric bars, means for suspending each of said bars for free end vibration between said mass and said frame symmetrically with respect to said axis, said means including tension members attached to each of said bars at substantially the nodal loci and extending between each of said bars and said frame and between each of said bars and said mass and adapted to vary the longitudinal tension of each of said bars in accordance with the change in tension in said tension members, oscillator means for keeping said bars vibrating at their natural frequencies.

8. In an accelerometer for sensing acceleration along an axis, a frame, a mass suspended in said frame for freedom of motion along said axis, a pair of flexure mode piezoelectric bars, means for suspending each of said bars for free end vibration between said mass and said frame symmetrically with respect to said axis, said means including a plurality of tension members attached at one end to each of said bars at substantially the nodal loci, one half of said tension members being attached at the other ends to said mass and the other half of said tension members being attached at the other ends to said frame at locations displaced longitudinally of each of said bars from said nodal loci away from the center of each of said bars whereby the tension in each of said bars is varied in accordance with the change in tension in said tension members, oscillator means for keeping said bars vibrating at their natural frequencies.

9. In an accelerometer for sensing acceleration along an axis, a frame, a mass suspended in said frame for freedom of motion along said axis, a pair of flexure mode piezoelectric bars, means for suspending each of said bars for free end vibration between said mass and said frame symmetrically with respect to said axis, said means including tension members attached to each of said bars at substantially the nodal loci and extending between each of said bars and said frame and between each of said bars and said mass and adapted to vary the longitudinal tension of each of said bars in accordance with the change in tension in said tension members, oscillator means for keeping said bars vibrating at their natural frequencies and means for obtaining the difference between said natural frequencies to determine the acceleration of said frame.

10. In an accelerometer for sensing acceleration along an axis, a frame, a mass suspended in said frame for freedom of motion along said axis, a pair of flexure mode piezoelectric bars, means for suspending each of said bars for free end vibration between said mass and said frame symmetrically with respect to said axis, said means including a plurality of tension members attached at one end to each of said bars at substantially the nodal loci, one half of said tension members being attached at the other ends to said mass and the other half of said tension members being attached at the other ends to said frame at locations displaced longitudinally of each of said bars from said nodal loci away from the center of each of said bars whereby the tension in each of said bars is varied in accordance with the change in tension in said tension members, oscillator means for keeping said bars vibrating at their natural frequencies and means for obtaining the difference between said natural frequencies to determine the acceleration of said frame.

References Cited in the file of this patent

UNITED STATES PATENTS

| | | |
|---|---|---|
| 2,315,392 | Bokovoy | Mar. 30, 1943 |
| 2,371,626 | Kecskemeti | Mar. 20, 1945 |
| 2,410,825 | Lane | Nov. 12, 1946 |
| 2,728,868 | Peterson | Dec. 27, 1955 |

FOREIGN PATENTS

| | | |
|---|---|---|
| 729,894 | Germany | Dec. 19, 1942 |